(12) United States Patent
Magcale

(10) Patent No.: US 11,704,189 B1
(45) Date of Patent: *Jul. 18, 2023

(54) SYSTEM AND METHOD FOR AUTONOMOUS DATA CENTER OPERATION AND HEALING

(71) Applicant: Nautilus TRUE, LLC, San Ramon, CA (US)

(72) Inventor: Arnold Castillo Magcale, San Ramon, CA (US)

(73) Assignee: Nautilus TRUE, LLC, San Ramon, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/902,430

(22) Filed: Jun. 16, 2020

Related U.S. Application Data

(63) Continuation of application No. 16/248,770, filed on Jan. 16, 2019, now Pat. No. 11,262,089, which is a continuation of application No. 15/970,160, filed on May 3, 2018, now Pat. No. 10,673,684.

(51) Int. Cl.
  *G06F 11/07* (2006.01)
  *G06F 16/23* (2019.01)

(52) U.S. Cl.
  CPC ...... *G06F 11/0793* (2013.01); *G06F 11/0709* (2013.01); *G06F 11/079* (2013.01); *G06F 11/0751* (2013.01); *G06F 16/2379* (2019.01)

(58) Field of Classification Search
  CPC ............ G06F 11/0793; G06F 16/2379; G06F 11/0709; G06F 11/0751; G06F 11/079
  See application file for complete search history.

(56) References Cited

U.S. PATENT DOCUMENTS

| | | | | |
|---|---|---|---|---|
| 2007/0022313 A1* | 1/2007 | Mackey | ............... | H04L 41/0686 714/4.4 |
| 2011/0320388 A1* | 12/2011 | Wong | ................. | G05B 23/0232 706/12 |
| 2016/0072891 A1* | 3/2016 | Joshi | ................... | G06Q 30/0641 370/254 |

* cited by examiner

*Primary Examiner* — Wissam Rashid

(74) *Attorney, Agent, or Firm* — Wilson Sonsini Goodrich & Rosati

(57) ABSTRACT

Methods and systems for autonomous computing comprising processing historical data to analyze a past performance, collecting data from a plurality of connected devices over a network, synchronizing the collected data from the plurality of connected devices with the processed historical data. Based on the synchronized data, methods and systems disclosed include detecting an alert (error/fault) condition in one or more of the plurality of connected devices, based on the detected alert condition, triggering the delivery of the detected alert condition to an automated network operations center (NOC), and matching the determined alert condition to a historical alert condition by the network operations center. Based on the matching, methods and systems include determining a corrective action, and based on the determined corrective action, assigning a virtual self-healing module from a plurality of virtual self-healing modules. Finally, a trigger to performance of the determined corrective action by the assigned virtual self-healing module is initiated.

20 Claims, 4 Drawing Sheets

US 11,704,189 B1

SYSTEM AND METHOD FOR AUTONOMOUS DATA CENTER OPERATION AND HEALING

CROSS REFERENCE TO RELATED APPLICATIONS

The application claims priority over U.S. Non-Provisional application Ser. No. 14/591,572 filed on Jan. 7, 2015 entitled "A Data Center Infrastructure Management (DCIM) system comprising predictive analytics" the contents of which are incorporated by reference in their entirety.

FIELD

The present invention relates to autonomous computing systems, but more particularly to the realm of autonomous data centers designed to function without human supervision and input, and capable of running themselves, heat extraction, self-healing, self-sizing (i.e. dynamic capacity increase/decrease), capacity planning and resource allocation and sharing.

BACKGROUND

The world has undergone a digital transformation over the last 10 years wherein technology and mobility have transformed the world and our lives, from both the individual and enterprise perspective, impacting the amount and accessibility of information, as well as how we communicate and collaborate with one another.

At the same time, the Internet of Things (IoT) continues to expand each day, and big data keeps getting bigger, becoming more and more ingrained in our daily lives— whether we're aware of it or not. A closer look at the heart—or brain—of this whole transformation, and it is the data center keeping it all afloat.

However, the ever-increasing reliance on data centers coupled with the future workforce demographic shift facing IT and other industries around the world, makes data centers and data center technologies vulnerable to skill shortage, and they have a lot to take into consideration in order to keep pace. However, by tapping into existing knowledge, connectivity and machine learning, data centers can undergo their own technology transformation to strengthen their future workforce and performance. Embodiments disclosed enable precisely such a technology transformation.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for autonomous computing including: processing historical data to analyze a past performance; collecting data from a plurality of connected devices over a network; synchronizing the collected data from the plurality of connected devices with the processed historical data; based on the synchronized data, detecting an alert (error, fault, warning, etc.) condition in one or more of the plurality of connected devices; based on the detected alert condition, triggering the delivery of the detected alert condition to an automated network operations center (NOC); matching the determined alert condition to a historical alert condition by the network operations center; based on the matching, determining a corrective action; based on the determined corrective action, assigning a virtual self-healing module from a plurality of virtual self-healing modules; and triggering the performance of the determined corrective action by the assigned virtual self-healing module. Other embodiments of this aspect include corresponding computer systems, apparatus, and computer programs recorded on one or more computer storage devices, each configured to perform the actions of the methods.

One general aspect includes a system for autonomous computing including a processing unit coupled to a non-transitory storage memory element, and having encoded instructions stored in the in the non-transitory storage memory element, which instructions when implemented by the processing unit, cause the system to: process historical data to analyze a past performance; collect data from a plurality of connected devices over a network; synchronize the collected data from the plurality of connected devices with the processed historical data; based on the synchronized data, detect an alert (error, fault, warning, etc.) condition in one or more of the plurality of connected devices; based on the detected alert condition, trigger the delivery of the detected alert condition to an automated network operations center (NOC); match the determined alert condition to a historical alert condition by the network operations center; based on the match, determine a corrective action; based on the determined corrective action, assign a virtual self-healing module from a plurality of virtual self-healing modules; and trigger the performance of the determined corrective action by the assigned virtual self-healing module. Other embodiments of this aspect include corresponding computer systems, apparatus, and computer programs recorded on one or more computer storage devices, each configured to perform the actions of the methods.

DETAILED DESCRIPTION

Figure 1:
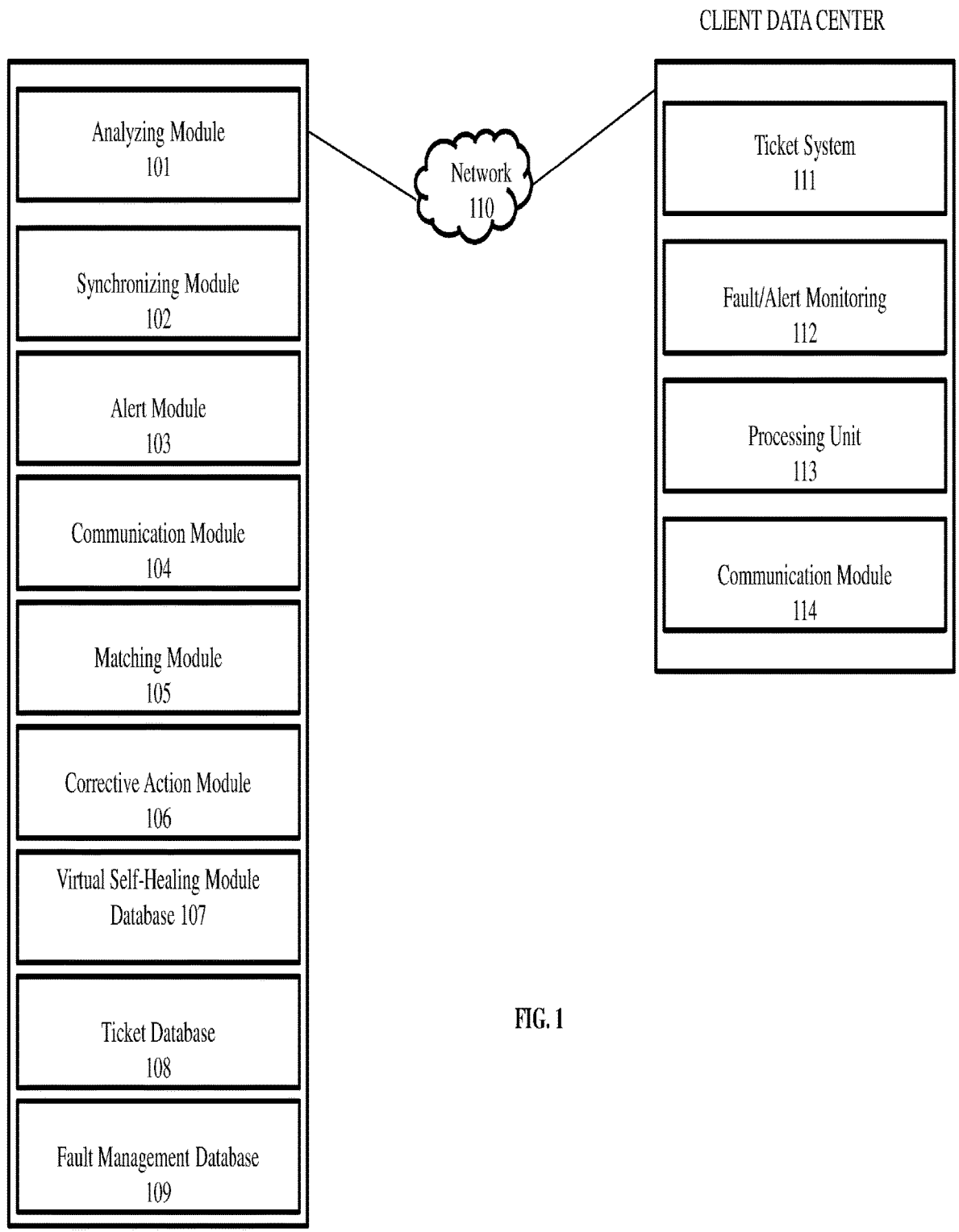
FIG. 1 illustrates the system according to an embodiment.

The following is a detailed description of embodiments of the invention depicted in the accompanying drawings. The embodiments are introduced in such detail as to clearly communicate the invention. However, the embodiment(s) presented herein are merely illustrative and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

As stated above, the traditional way of monitoring data center infrastructure, collecting data from infrastructure systems, and managing the systems to allow maximizing the operational efficiency is now struggling to cope with new challenges brought by the growing complexity of data centers. Traditional data center management systems and methods are hopelessly inadequate in light of current scale and increased compute density. Embodiments disclosed include systems and methods that address these challenges effectively and efficiently.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for autonomous computing including: processing historical data to analyze a past performance; collecting data from a plurality of connected devices over a network; synchronizing the collected data from the plurality of connected devices with the processed historical data; based on the synchronized data, detecting an alert (error, fault, warning, etc.) condition in one or more of the plurality of connected devices; based on the detected alert condition, triggering the delivery of the detected alert condition to an automated network operations center (NOC); matching the determined alert condition to a historical alert condition by the network operations center; based on the matching, determining a corrective action; based on the determined corrective action, assigning a virtual self-healing module from a plurality of virtual self-healing modules; and triggering the performance of the determined corrective action by the assigned virtual self-healing module.

According to an alternate embodiment, based on the detected alert condition, matching the determined alert condition to a historical alert condition is performed by a data management center server. Based on the matching, the data management center server determines a corrective action and assigns a virtual self-healing module from a plurality of virtual self-healing modules comprised in the data management center server. Subsequently the data management center server triggers the performance of the determined corrective action by the assigned virtual self-healing module. Other embodiments of this aspect include corresponding computer systems, apparatus, and computer programs recorded on one or more computer storage devices, each configured to perform the actions of the methods.

Implementations may include one or more of the following features. The computer implemented method further includes sending, by the data management center server, a ticket identifying the alert (error, fault, warning, etc.) condition and a list of virtual self-healing modules to a ticketing system of a client data center; detecting, by the data management center server, a ticket update in a ticket database of the data management center server, the ticket update including an assignment of a select one of the virtual self-healing modules according to the identified alert condition; updating, by the data management center server, an alert condition database to include the assignment of the select one of the virtual self-healing modules to the alert condition; and initiating the select one of the virtual self-healing modules to resolve the alert condition.

An embodiment includes a system comprising a processing unit coupled to a memory element having encoded instructions stored therein. The instructions implemented by the processing unit further cause the system to: send, by a data management center server, a ticket identifying an alert (error, fault, warning, etc.) condition and a list of virtual self-healing modules to a ticketing system of a client data center; detect, by the data management center server, a ticket update in a ticket database of the data management center server, the ticket update including an assignment of a select one of the virtual self-healing modules according to the identified alert condition; update, by the data management center server, an alert condition database to include the assignment of the select one of the virtual self-healing modules to the alert condition; and initiate the select one of the virtual self-healing modules to resolve the alert condition. Implementations of the described techniques may include hardware, a method or process, or computer software on a computer-accessible medium.

One general aspect includes a system for autonomous computing including a processing unit coupled to a non-transitory storage memory element, and having encoded instructions stored in the memory element, which instructions when implemented by the processing unit, cause the system to: process historical data to analyze a past performance; collect data from a plurality of connected devices over a network; synchronize the collected data from the plurality of connected devices with the processed historical data; based on the synchronized data, detect an alert (error, fault, warning, etc.) condition in one or more of the plurality of connected devices; based on the detected alert condition, trigger the delivery of the detected alert condition to an automated network operations center (NOC); match the determined alert condition to a historical alert condition by the network operations center; based on the match, determine a corrective action; based on the determined corrective action, assign a virtual self-healing module from a plurality of virtual self-healing modules; and trigger the performance of the determined corrective action by the assigned virtual self-healing module.

According to an alternate embodiment, based on the detected alert condition, the system matches the determined alert condition to a historical alert condition by the network. And based on the match, the system determines a corrective action. Based on the determined corrective action, the system assigns a virtual self-healing module from a plurality of virtual self-healing modules comprised in the system and triggers the performance of the determined corrective action by the assigned virtual self-healing module. Other embodiments of this aspect include corresponding computer systems, apparatus, and computer programs recorded on one or more computer storage devices, each configured to perform the actions of the methods.

Implementations may include one or more of the following features. The system where the implemented instructions further cause the system to: send, by a data management center server, a ticket identifying the alert (error, fault, warning, etc.) condition and a list of virtual self-healing modules to a ticketing system of a client data center; detect, by the data management center server, a ticket update in a ticket database of the data management center server, the ticket update including an assignment of a select one of the virtual self-healing modules according to the identified alert condition; update, by the data management center server, an alert condition database to include the assignment of the select one of the virtual self-healing modules to the alert condition; and initiate the select one of the virtual self-healing modules to resolve the alert condition. Implementations of the described techniques may include hardware, a method or process, or computer software on a computer-accessible medium.

FIG. 1 illustrates the system according to an embodiment. Data management center server comprises analyzing module 101 to process historical data to analyze a past performance and synchronizing module 102 to synchronize collected data from a plurality of connected devices with prior processed historical data. Alert module 103 is configured to detect an alert condition such as an error or a fault, in one or more of the plurality of connected devices. And based on the detected alert condition, communication module 104 is configured to trigger the delivery of the detected alert condition to an automated network operations center (NOC). Alternatively, matching module 105 matches the determined alert condition to a historical alert condition and based on the match, corrective action module 106 determines a corrective action. Based on the match determined by matching module 105, corrective action module 106 assigns a virtual self-healing module from a plurality of virtual self-healing modules in a virtual self-healing module database 107, and then triggers the performance of the determined corrective action by the assigned virtual self-healing module. Ticket database 108 identifies and tags the alert condition, the determined solution, and the result. Ticket database 108 communicates with, updates, and is updated by a ticketing system 111 in a client data center. The data management center server detects a ticket update in ticket database 108, the update including a record of an assignment of a single or plurality of virtual self-healing modules according to the identified alert condition. Accordingly, alert condition database in alert module 103 is also updated, the update including the assignment of the select one of the virtual self-healing modules to the alert condition. Tracking alerts, errors and faults by the ticketing system is supported by fault management database 109, wherein ticket database 108 and fault managements database 109 are configured for bi-directional communication and updates with client data center ticket system 111 client data center fault/alert monitoring system 112 driven by processing unit 113 and communication module 114.

According to an embodiment of the computer implemented method, the synchronizing of the collected data is performed by a dedicated synchronization module. Preferably, the computer implemented method further comprises a first self-healing module configured to perform the determined corrective action. Additionally, the method includes initiating, by the synchronization module, a fault management update in a fault management/tracking system and sending, by the synchronization module, the fault management update to a fault management database.

According to an embodiment, the computer implemented method further comprises monitoring, by a second self-healing module, the fault management database for the fault management update, wherein the detecting the fault management update is performed by the second self-healing module. Preferably, updating the fault management database and initiating the select one of the self-healing modules to perform the determined corrective action are performed by the second self-healing module.

According to an embodiment, the computer implemented method further comprises determining that the determined error condition was resolved by the select one of the self-healing modules. And additionally, the computer implemented method comprises determining that the determined error condition was not resolved by the select one of the self-healing modules. Accordingly, the method includes an updating step, i.e. updating the ticket to generate an updated ticket, and sending the updated ticket to the ticketing system of the client data center.

Figure 2:
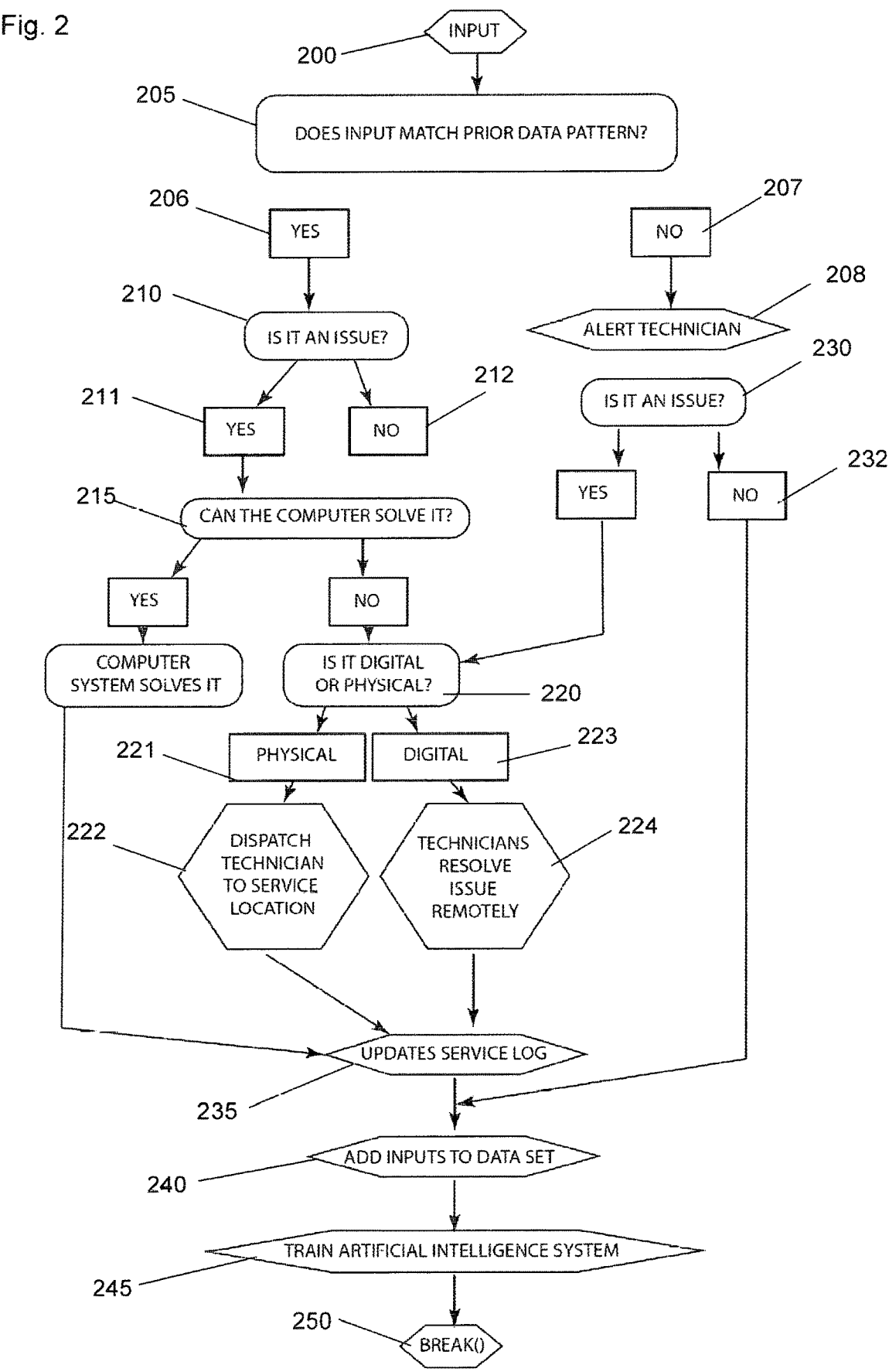
FIG. 2 illustrates the method according to an alternate embodiment.

FIG. 2 illustrates the method according to an alternate embodiment. Input step 200 initiates an analysis of a client data center by a data management center server. Step 205 includes checking whether the input matches a prior pattern. If it is affirmed (step 206) then an analysis is performed to determine if the matched prior pattern is an alert, error or fault condition. If the matched prior pattern is in fact an alert, error, or fault condition (step 211) then it is determined if the alert, error or fault condition can be fixed autonomously, without manual or human intervention (step 215). Accordingly, a solution is found, solved by the computer, a service log is updated (step 235), the inputs are added to reference data set (step 240), the artificial intelligence system is recalibrated (step 245) and the job is closed in step 250. If in step 215 it is determined that the alert, error or fault condition cannot be fixed autonomously, then it is determined if the alert, error or fault is digital or physical. If it is physical (step 221) a notification is sent via the NOC to assign and dispatch a technician (step 222) to the client data center location. If the alert, error or fault condition is digital (step 223) then an assigned technician is notified and the issue is resolved remotely (step 224). Either way, once the issue is resolved, steps 235, 240, 245 and finally 250 are repeated. If in step 205 the input does not match a prior pattern, and an anomaly is detected (step 207) a technician is alerted (step 208) and if an alert, error or fault condition is detected (step 230) then steps 220 through 250 are repeated. If, however after step 230 it is determined that there is no alert, error or fault condition (step 232) then the job is closed in step 250.

Figure 3A:
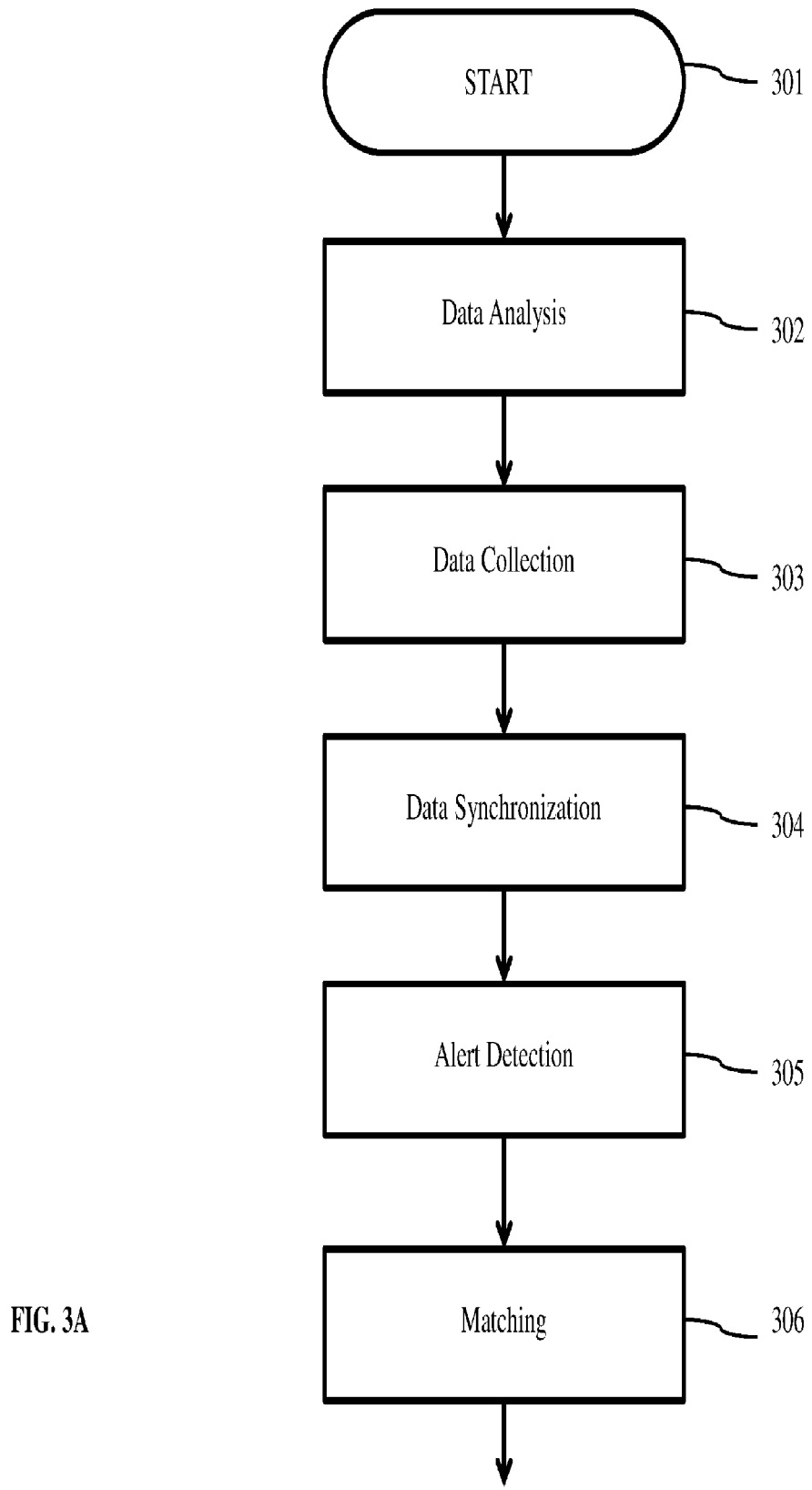
FIGS. 3A illustrate the steps in a simplified method, according to an embodiment.
Figure 3B:
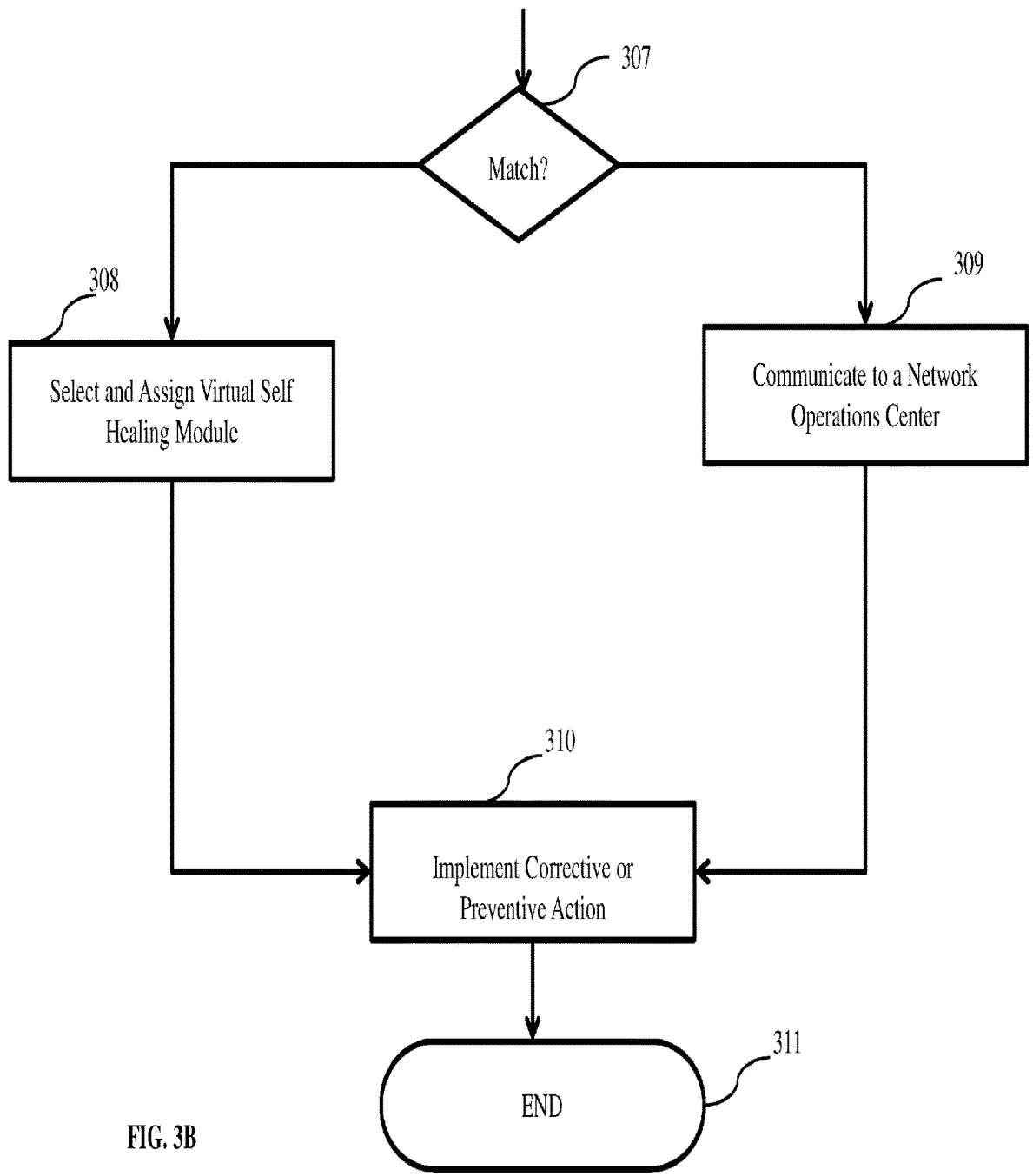
FIGS. 3B illustrate the steps in a simplified method, according to an embodiment.

FIGS. 3A and 3B illustrate the steps in a simplified method, according to an embodiment. The method is initiated at step 301 and begins with data analysis in step 302. Data collection step 303 is a continuous process and the collected data is synchronized with historical data in step 304. Once synchronized an alert detection step 305 for an anomaly, error or faulty condition is implemented. Anomalies, if found, are matched with historical anomalies, and pre-existing solutions, if any, are searched for in step 306. Preferably, pre-existing solutions are selected from a database of virtual self-healing modules. Decision making step 307 searches for a match. If a match is found, a virtual self-healing module from a plurality of self-healing modules is assigned in step 308. If a match is not found, then communication with a network operations center (NOC) is initiated to search for an alternative, in step 309. Irrespective of whether a match is found or not, corrective or preventive action is implemented in step 310. After such action, the job is closed in step 311.

According to an embodiment, the computer implemented method further comprises sending, by a data management center server, a ticket identifying the alert (error, fault, warning, etc.) condition and a list of virtual self-healing modules to a ticketing system of a client data center, detecting, by the data management center server, a ticket update in a ticket database of the data management center server, the ticket update including an assignment of a select one of the virtual self-healing modules according to the identified alert condition, updating, by the data management center server, an alert condition database to include the assignment of the select one of the virtual self-healing modules to the alert condition, and initiating the select one of the virtual self-healing modules to resolve the alert condition.

Embodiments disclosed include a system for autonomous computing comprising a processing unit coupled to a non-transitory storage memory element, and having encoded instructions stored in the memory element, which instructions are implemented by the processing unit. The implemented instructions cause the system to process historical data to analyze a past performance, collect data from a plurality of connected devices over a network, and synchronize the collected data from the plurality of connected devices with the processed historical data. Preferably, and based on the synchronized data, the system is configured to detect an alert (error, fault, warning, etc.) condition in one or more of the plurality of connected devices. And based on the detected alert condition, the disclosed system can trigger the delivery of the detected alert condition to an automated network operations center (NOC). In one embodiment, the system is caused to match the determined alert condition to a historical alert condition via the network operations center, and based on the match, determine a corrective action. In an additional embodiment, the system is caused to, based on the determined corrective action, assign a virtual self-healing module from a plurality of virtual self-healing modules, and then trigger the performance of the determined corrective action by the assigned virtual self-healing module.

According to an embodiment, the system includes a dedicated synchronization module to synchronize the collected data, and a first self-healing module configured to perform the determined corrective action. Preferably, the encoded instructions further cause the system to initiate, by the synchronization module, a fault management update in a fault management/tracking system and send, by the synchronization module, the fault management update to a fault management database.

In an embodiment, the implemented instructions further cause the system to monitor, by a second self-healing module, the fault management database for the fault management update, wherein detecting the fault management update is performed by the second self-healing module.

According to an embodiment, the implemented instructions further cause the system to: update the fault management database and initiate the select one of the self-healing modules to perform the determined corrective action via the second self-healing module. Additionally, the implemented instructions further cause the system to: determine that the determined error condition was resolved by the select one of the self-healing modules. And further to determine that the determined error condition was not resolved by the select one of the self-healing modules. Subsequently the system is caused to update the ticket to generate an updated ticket and send the updated ticket to the ticketing system of the client data center.

According to one embodiment, the implemented instructions further cause the system to send, by a data management center server, a ticket identifying the alert (error, fault, warning, etc.) condition and a list of virtual self-healing modules to a ticketing system of a client data center. The data management server can detect a ticket update in a ticket database contained in the data management center server. The detected ticket update preferably includes an assignment of a select one of the virtual self-healing modules according to the identified alert condition. Additionally, according to an embodiment the data management server updates an alert condition database to include the assignment of the selected one of the virtual self-healing modules to the alert condition and initiates the selection of one of the virtual self-healing modules to resolve the alert condition.

Embodiments disclosed above include autonomous, self-functioning data center's analogous to autonomous, self-driving cars, designed to function with little or no human input. Data center operating technologies disclosed include systems and methods that enable self-running, heat extraction, self-healing and even self-sizing capabilities. Additional embodiments include dynamic, predictive analytics driven capacity planning that enable, based on capacity planning, dynamic resource allocation, like for example, even water and air circulation control in thermal containment units, and accordingly control systems to turn up more connectivity, bandwidth, and dynamic cyber security.

Embodiments disclosed include methods and systems configured and configurable to tap into existing knowledge, and to connectivity technologies and implement machine learning, enabling data centers to undergo their own technology transformations continuously, to strengthen their future workforce and performance.

Embodiments disclosed include methods and systems configured to update and upgrade data centers using data as a guide—Preferably, previous/historical data is used to analyze past equipment performance as well as vendor performance history, quality, etc. Additionally, network connectivity is leveraged—Connecting the above data across devices and servers within and outside the data center can yield even greater results. In many of today's data centers, when a problem arises, it typically prompts an alert that lacks context and requires an in-person diagnosis and resolution. Any intelligence gained during the process also must be recorded manually. This hands-on process can prove to be problematic for a number of reasons, most notably data center location and staff proximity. Not to mention, if the technician fails to complete the last step, key learnings to improve future performance are lost.

Embodiments disclosed enable automated fault management and self-healing within the data center, and over the cloud. According to an example embodiment, when a problem arises, it triggers the delivery of a notification to an automated network operations center (NOC) or control room. The NOC disseminates the user and role specific information to the concerned technician (or supervising virtual machine/s), providing any available additional context, information on root causes, and in some cases even a diagnosis before anyone sets foot on-site. In instances, where self-healing is ruled out, NOC personnel can guide on-site staff through the proper resolution and repair via Google Glass, Microsoft Hololens or other another virtual or augmented reality system. Lastly, to close the loop on the entire process, all data tied to each step of the procedure, including changes and/or feedback, is synchronized to the knowledge base in the cloud to further refine and improve future outcomes.

Embodiments disclosed enable automatic capture of information that can be used in future monitoring and troubleshooting. Through the cloud, data center providers can aggregate, anonymize and analyze data from various deployments around the world and, in-turn, provide learnings from the industry as a whole. Embodiments disclosed include methods and systems for aggregating knowledge to yield not only more efficient diagnostics and resolutions, but also smarter, proactive notifications based on data collected from a broad spectrum of customers, models, devices and systems.

Embodiments disclosed enable proactive notifications on maintenance predictions and energy-saving recommendations in data centers, leveraging and utilizing global insights to reduce maintenance trips and associated risk, and downtime.

Embodiments disclosed combine data, connectivity and machine learning, enabling data centers to adapt to changing environments and loads, implementing predictive and autonomous capabilities.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus, it will be understood by those skilled in the art of systems and methods that facilitate cooling of electronic systems, and more specifically automated cooling infrastructure especially pertaining to data centers, that although the preferred and alternate embodiments have been shown and described in accordance with the Patent Statutes, the invention is not limited thereto or thereby.

The figures illustrate the architecture, functionality, and operation of possible implementations of systems, methods and computer program products according to various embodiments of the present invention. It should also be noted that, in some alternative implementations, the functions noted/illustrated may occur out of the order noted in the figures. For example, two blocks shown in succession may, in fact, be executed concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the system and process is described with reference to autonomous data centers, the system and method is highly reconfigurable, and may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A computer-implemented method for autonomous computing comprising:
    collecting data from a plurality of connected devices over a network;
    checking if the collected data matches a prior pattern;
    based on the checking, detecting an alert condition in one or more of the plurality of connected devices;
    initiating a fault management update in a fault management database based on the detected alert condition;
    sending the fault management update to a fault management database;
    monitoring the fault management update using a first virtual self-healing module of a plurality of virtual self-healing modules;
    matching the detected alert condition to a historical alert condition;
    based on the matching, determining a corrective action; and
    based on the determined corrective action, using the first virtual self-healing module to: (i) assign one or more additional virtual self-healing modules selected from the plurality of virtual self-healing modules to the alert condition, and (ii) trigger the performance of the determined corrective action by initiating the assigned one or more additional virtual self-healing modules to perform the corrective action.

2. The computer implemented method of claim 1, wherein triggering the performance of the determined corrective action further comprises assigning a technician to manually resolve the corrective action digitally or physically.

3. The computer implemented method of claim 1, wherein:
    the detected alert condition is based on synchronizing collected data from the plurality of connected devices over the network with processed historical data of the plurality of connected devices over the network.

4. The computer implemented method of claim 1 wherein determining the corrective action comprises:
    at least one of determining if the corrective action can be resolved by assigning the one or more additional virtual self-healing modules selected from the plurality of virtual self-healing modules and determining if the corrective action can be resolved manually;
    wherein if the corrective action can be resolved manually, determining if the corrective action is digital or physical; and
    triggering the performance of the determined corrective action by assigning a technician to resolve the corrective action digitally or physically.

5. The computer implemented method of claim 1, further comprising:
    (i) sending, by a data management server, a ticket identifying the alert condition and a list of the plurality of virtual self-healing modules related to the alert condition to a ticket database of a client data center; and
    (ii) detecting, by the data management server, a ticket update in the ticket database.

6. The computer implemented method of claim 5, wherein the ticket update comprises the assignment of the one or more additional virtual self-healing modules according to the identified alert condition.

7. The computer implemented method of claim 5, further comprising:
updating the alert condition to include the assignment of the one or more additional virtual self-healing modules.

8. The computer implemented method of claim 5, wherein the ticket database and the fault management database are configured for bi-directional communication, and the method further comprises: updating the ticket and the fault management update upon resolution of the alert condition, or upon encountering an error during resolution of the alert condition.

9. The computer implemented method of claim 1, wherein the historical alert condition is based on historical data comprising past equipment performance and vendor performance.

10. The computer-implemented method of claim 4, further comprising:
guiding the technician through performance of the determined corrective action using a virtual or augmented reality system when the determined corrective action can be resolved manually.

11. A system for autonomous computing comprising a processing unit coupled to a non-transitory storage memory element, and having encoded instructions stored in the memory element, which instructions when implemented by the processing unit, cause the system to:
collect data from a plurality of connected devices over a network;
check if the collected data matches a prior pattern;
based on the check, determine an alert condition in one or more of the plurality of connected devices;
initiate a fault management update in a fault management database based on the detected alert condition;
send the fault management update to a fault management database;
monitor the fault management update using a first virtual self-healing module of a plurality of virtual self-healing modules;
match the determined alert condition to a historical alert condition;
based on the match, determine a corrective action; and
based on the determined corrective action, use the first virtual self-healing module to: (i) assign one or more additional virtual self-healing modules selected from the plurality of virtual self-healing modules to the alert condition, and (ii) trigger the performance of the determined corrective action by initiating the one or more additional virtual self-healing modules to perform the corrective action.

12. The system of claim 11 wherein in triggering the performance of the determined corrective action the system is further caused to:
assign a technician to manually resolve the corrective action digitally or physically.

13. The system of claim 11, wherein:
the detected alert condition is based on synchronizing collected data from the plurality of connected devices over the network with processed historical data of the plurality of connected devices over the network.

14. The system of claim 11 wherein determining the corrective action comprises:
at least one of determining if the corrective action can be resolved by assigning the one or more additional virtual self-healing modules selected from the plurality of virtual self-healing modules and determining if the corrective action can be resolved manually;
wherein if the corrective action can be resolved manually, determining if the corrective action is digital or physical; and
triggering the performance of the determined corrective action by assigning a technician to resolve the corrective action digitally or physically.

15. The system of claim 11, wherein the system is further caused to:
(i) send, by a data management server, a ticket identifying the alert condition and a list of the plurality of virtual self-healing modules related to the alert condition to a ticket database of a client data center; and
(ii) detect, by the data management server, a ticket update in the ticket database.

16. The system of claim 15, wherein the ticket update comprises the assignment of the one or more additional virtual self-healing modules according to the identified alert condition.

17. The system of claim 15, wherein the system is further caused to:
update the alert condition to include the assignment of the one or more additional virtual self-healing modules.

18. The system of claim 15, wherein the ticket database and the fault management database are configured for bi-directional communication, and the system is further caused to: update the ticket and the fault management update upon resolution of the alert condition, or upon encountering an error during resolution of the alert condition.

19. The system of claim 11, wherein the historical alert condition is based on historical data comprising past equipment performance and vendor performance.

20. The system of claim 11, wherein the system is further caused to:
guide the technician through performance of the determined corrective action using a virtual or augmented reality system when the determined corrective action can be resolved manually.

* * * * *